H. Y. McBRIDE.
MACHINE FOR TREATING WOOL.
APPLICATION FILED APR. 10, 1917.
1,323,885. Patented Dec. 2, 1919.
7 SHEETS—SHEET 4.
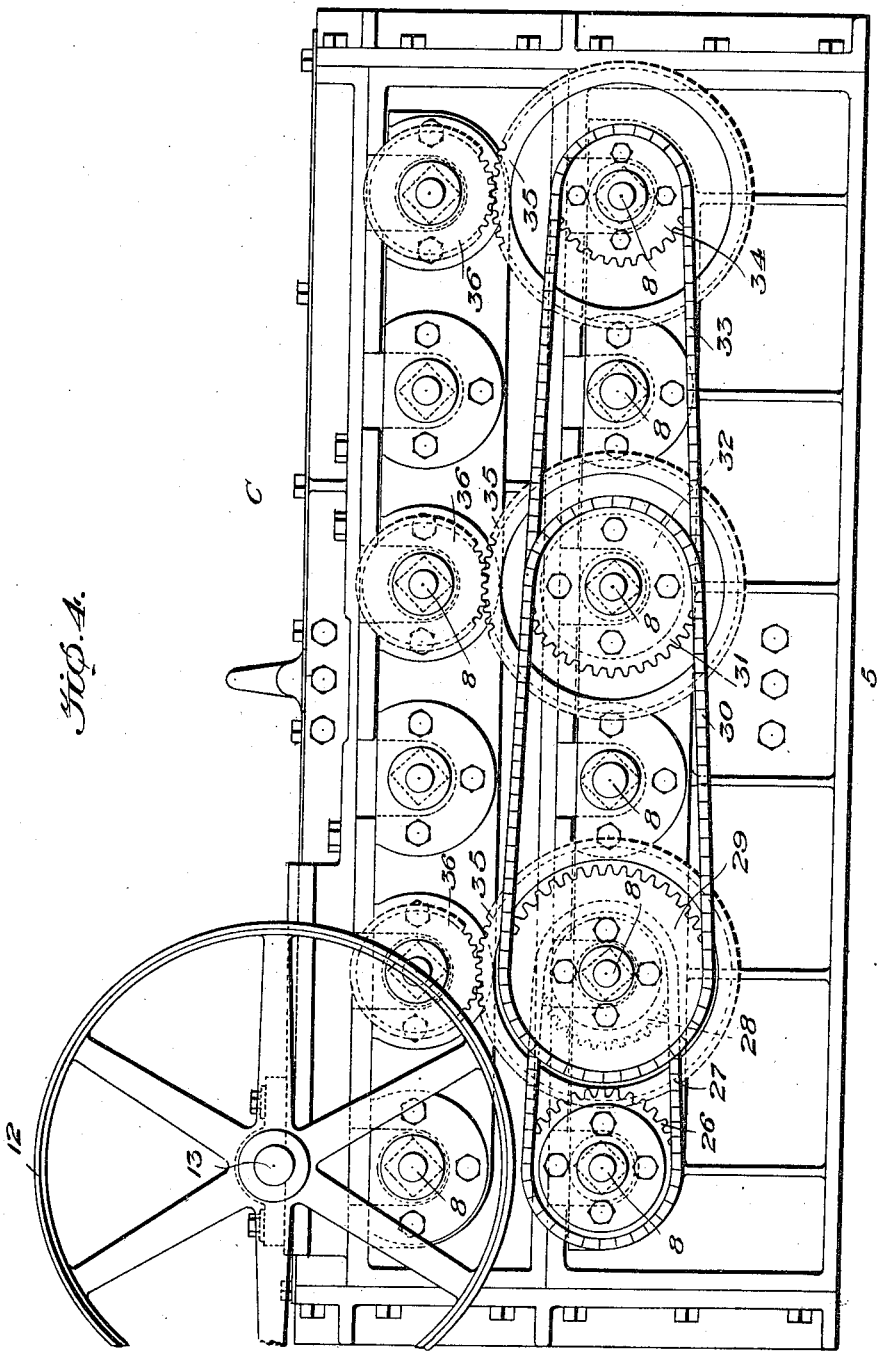

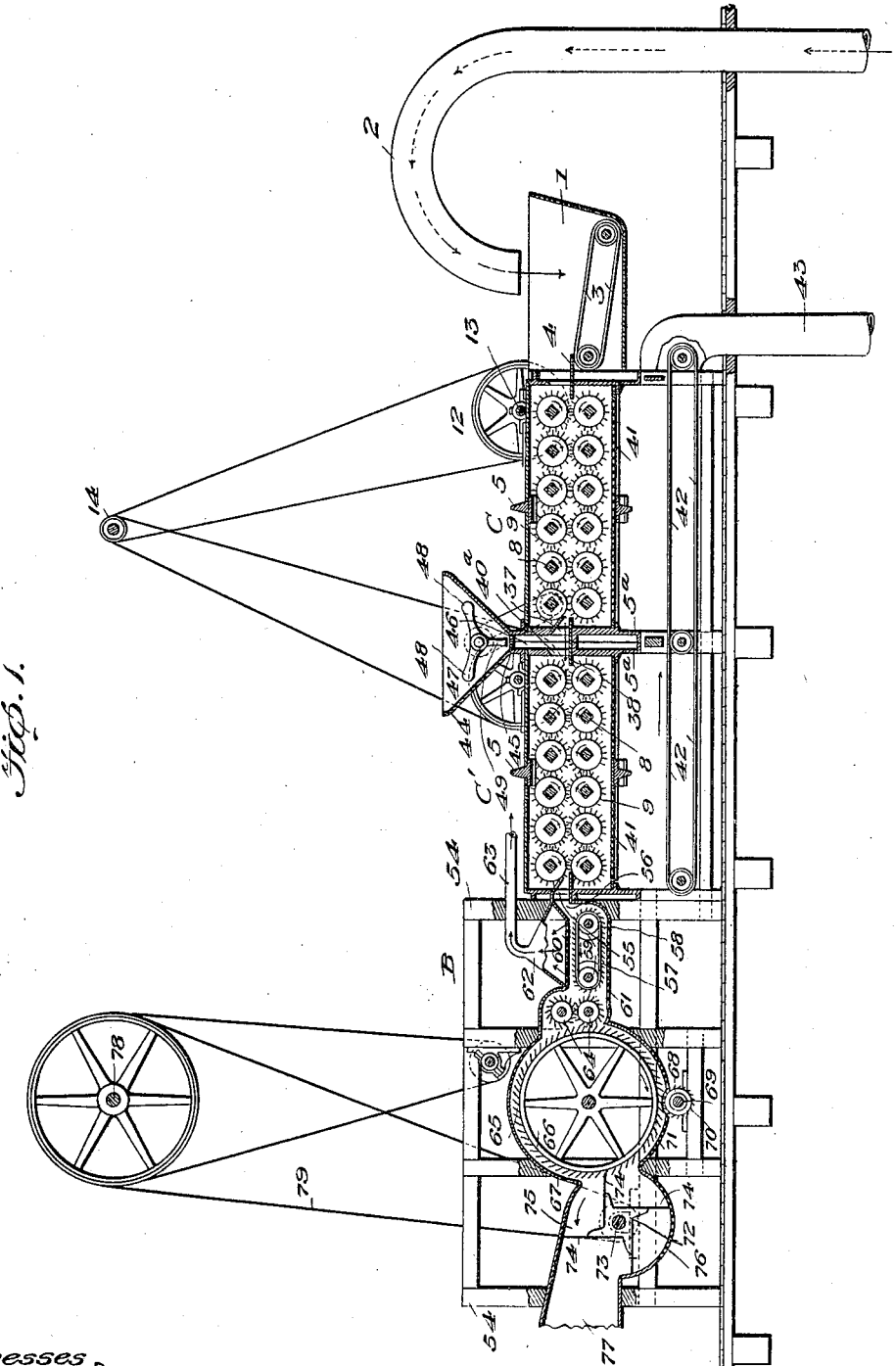

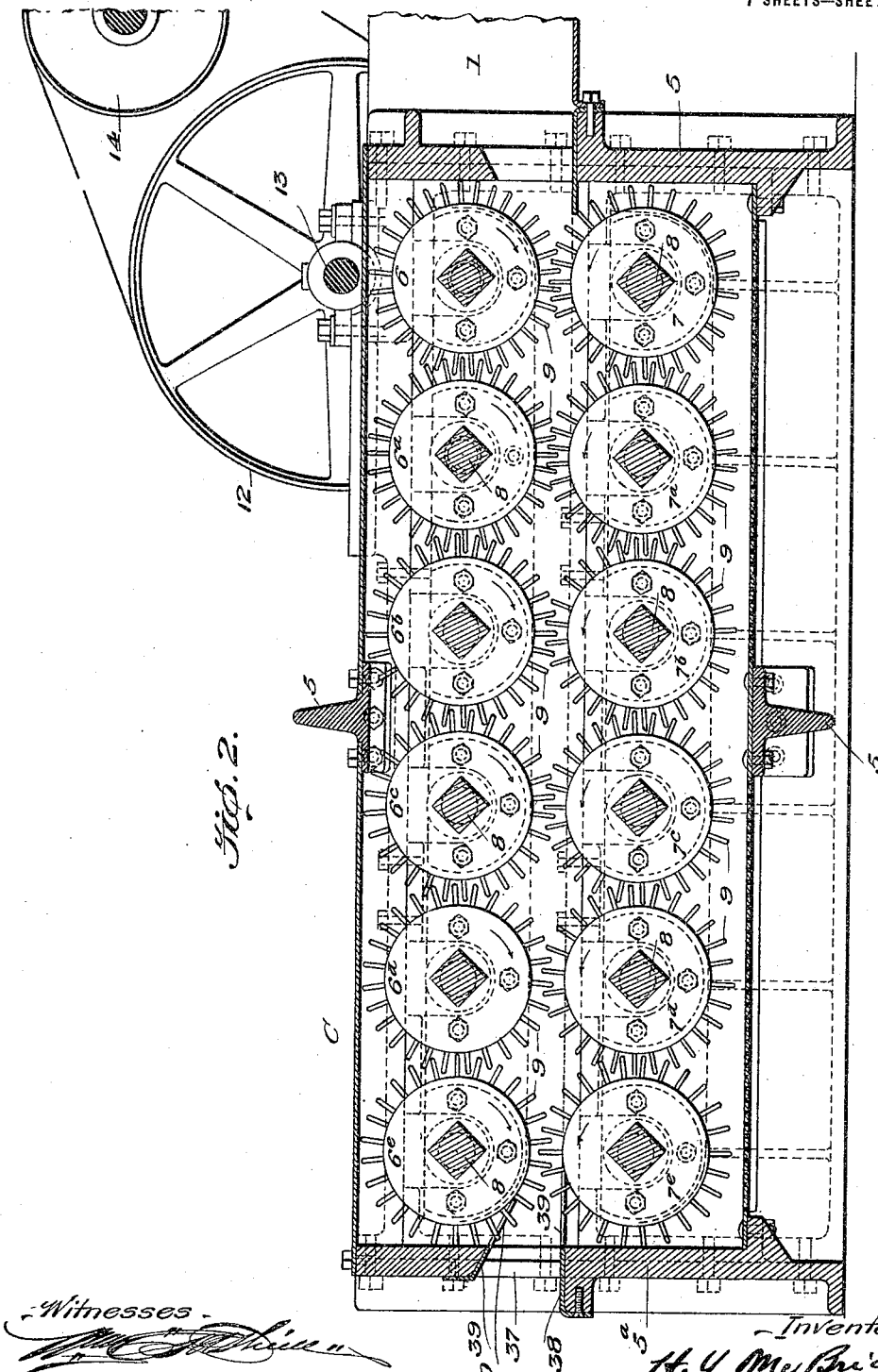

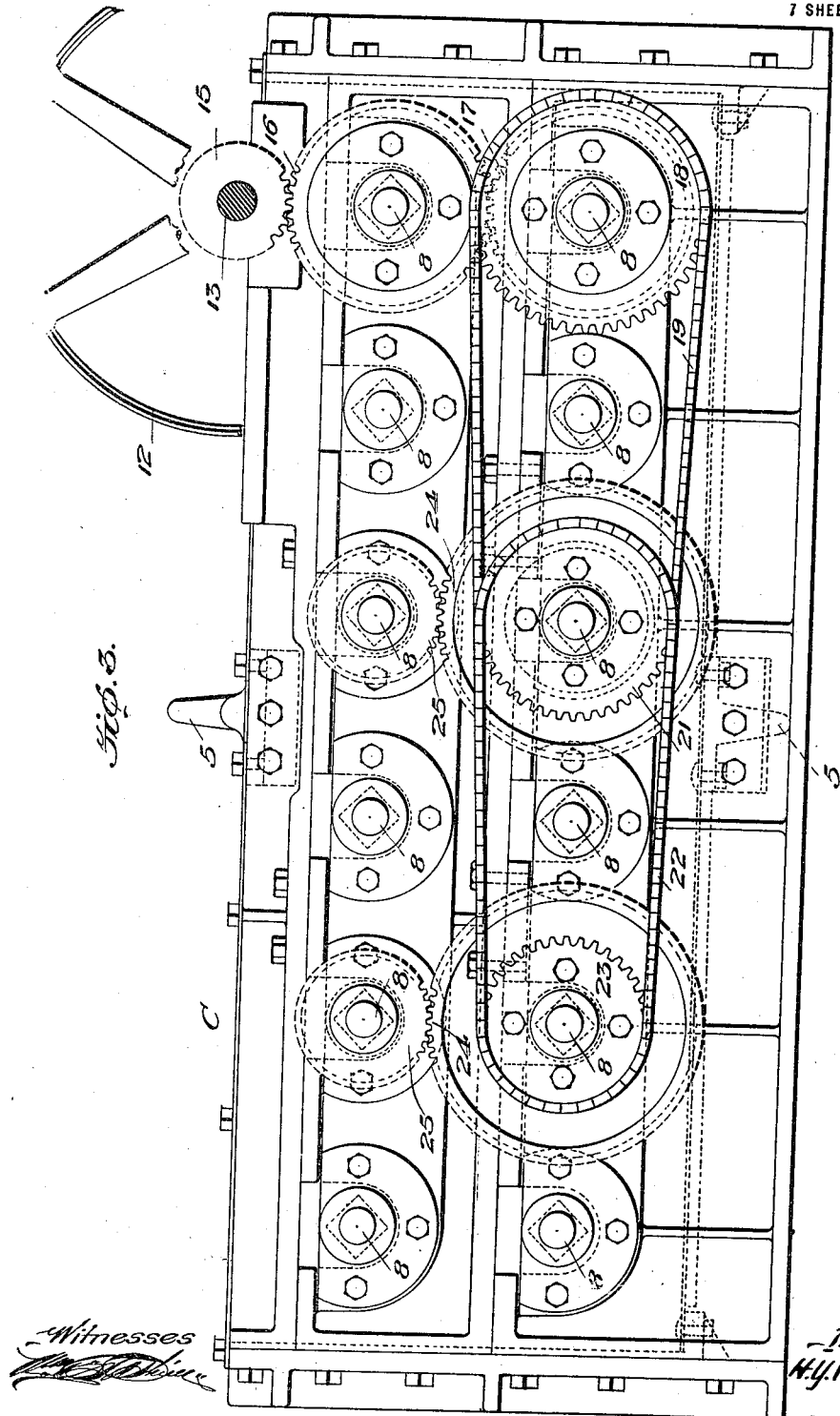

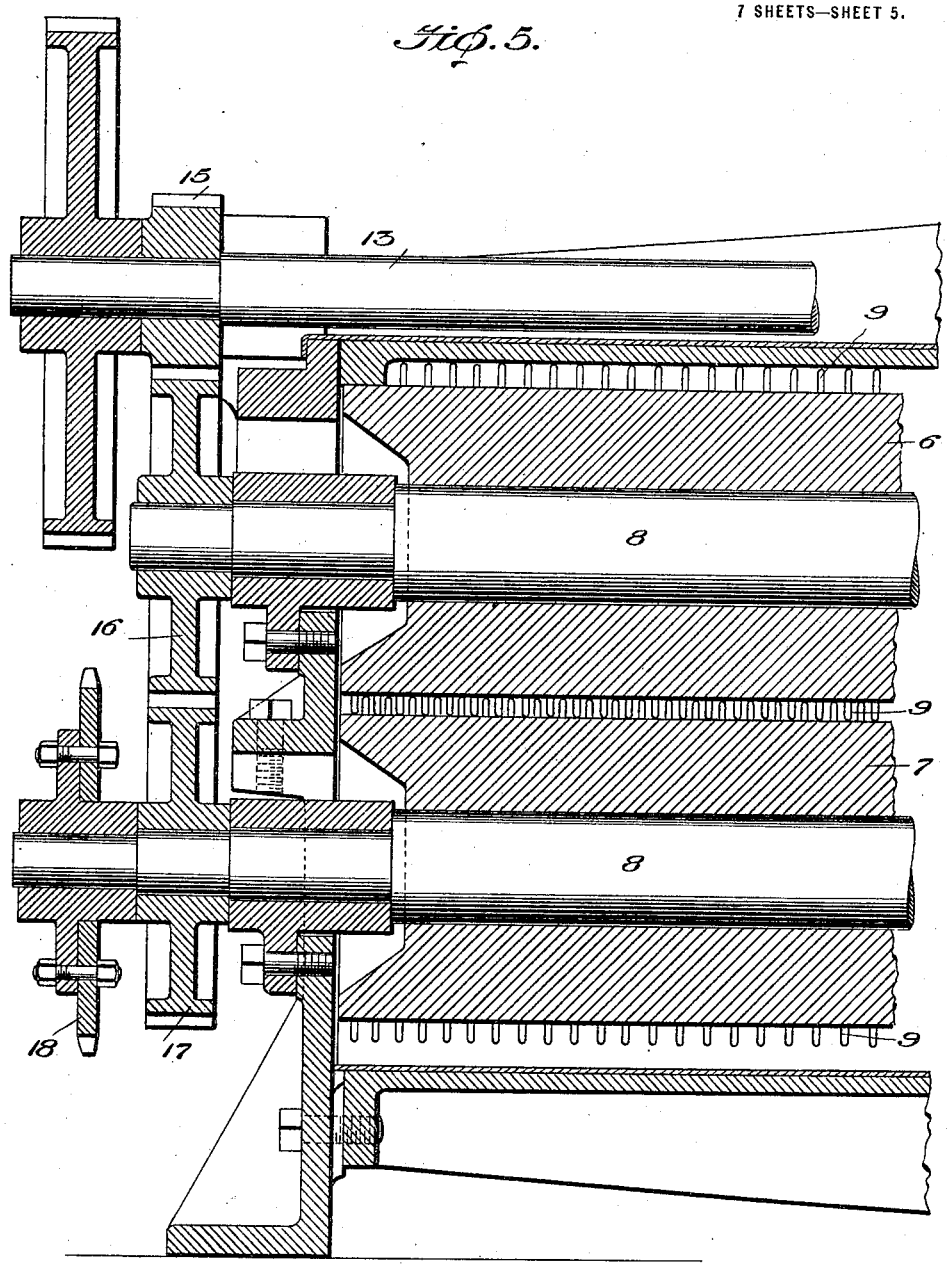

H. Y. McBRIDE.
MACHINE FOR TREATING WOOL.
APPLICATION FILED APR. 10, 1917.
1,323,885.
Patented Dec. 2, 1919.
7 SHEETS—SHEET 6.
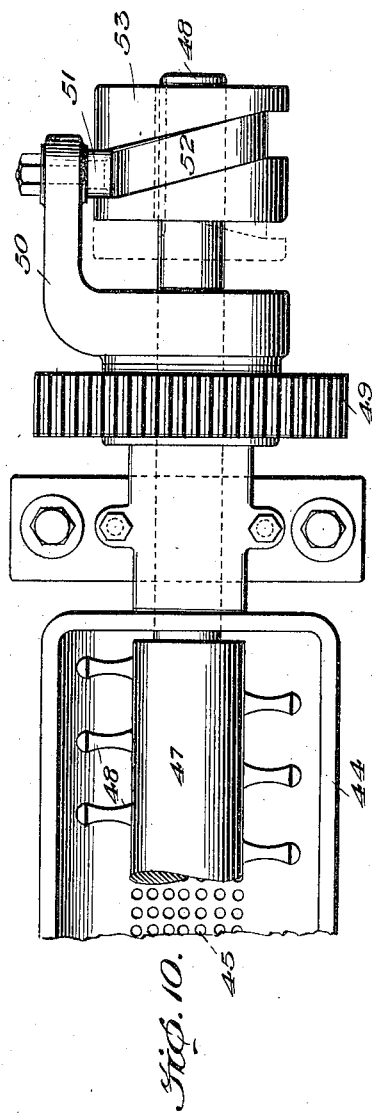
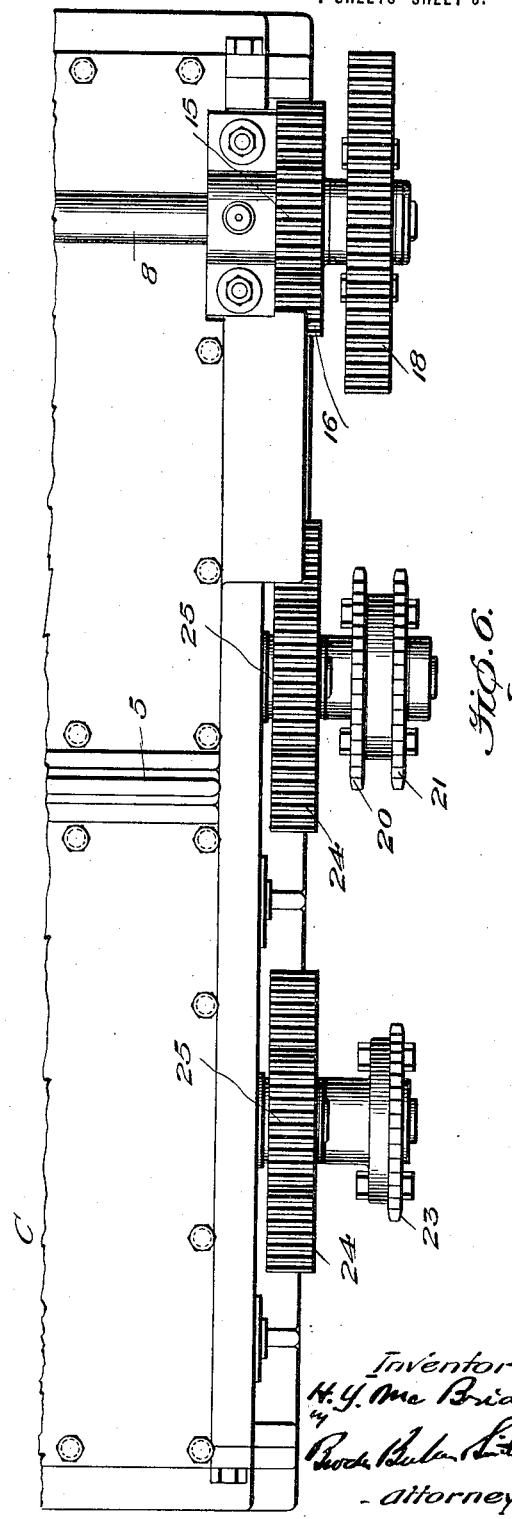

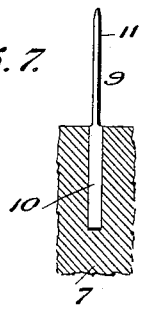
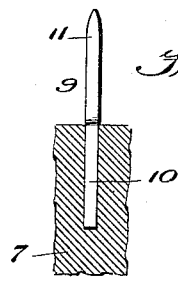
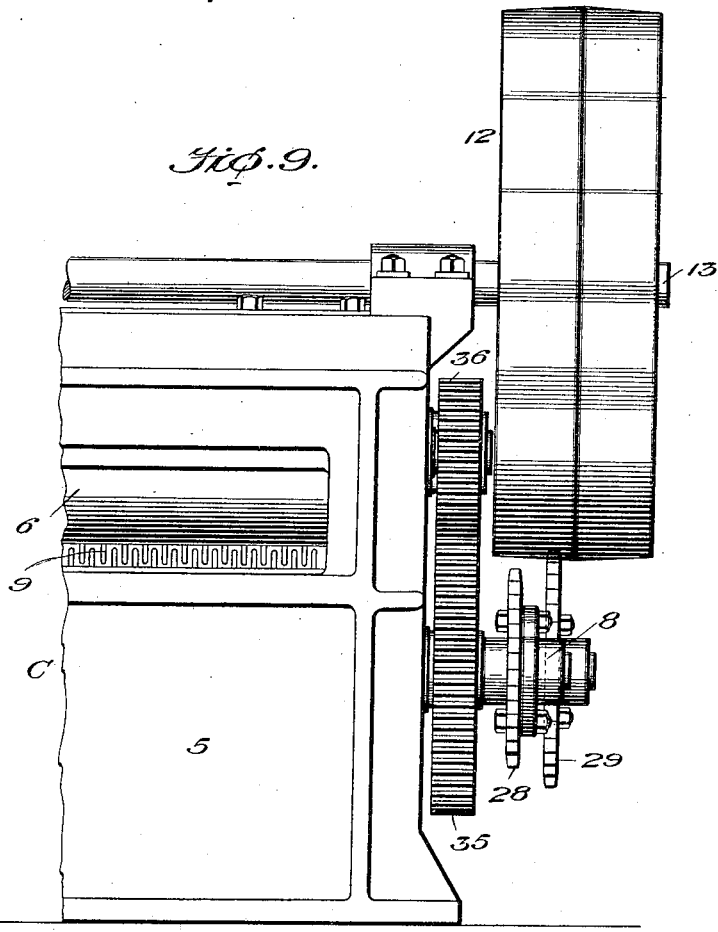

UNITED STATES PATENT OFFICE.

HIRAM Y. McBRIDE, OF ARTESIA, NEW MEXICO.

MACHINE FOR TREATING WOOL.

1,323,885.  Specification of Letters Patent.  Patented Dec. 2, 1919.

Application filed April 10, 1917. Serial No. 161,065.

*To all whom it may concern:*

Be it known that I, HIRAM Y. MCBRIDE, a citizen of the United States, residing at Artesia, New Mexico, have invented certain new and useful Improvements in Machines for Treating Wool, of which the following is a specification.

The general purpose of the invention is to provide means for combing and cleaning wool in a new and improved manner. To this end, a machine is provided which receives wool continuously, combs and cleans it progressively and discharges it in a superior straight and clean condition without requiring that the machine shall be stopped in the ordinary course of operations to remove from it either accumulated wool or dirt.

The most important part of the machine consists of one or more sets of combing devices which simultaneously comb and advance the wool progressively through the machine. Where more than one set of such devices is employed, the sets are arranged in sequence and usually each successive set is slightly modified as to structure or speed of operation so as to suitably modify its action upon the wool in the successive stages of combing.

In connection with this combing mechanism there may be employed in some cases one or more devices for supplying a pulverized cleaning or lubricating medium, depending upon the condition of the wool and the results to be obtained, as more fully described later.

In a preferred construction, the last combing mechanism delivers the wool to a beating mechanism, the principal purpose of which is to free the wool from all remaining dust or dirt.

In a preferred construction also suitable feeding means are provided for supplying the wool to the initial combing mechanism.

I will now describe an exemplifying structure embodying the invention, as shown in the accompanying drawing. After considering this embodiment it will be evident to persons skilled in the art that the principles of the invention may be embodied in many different constructions and I do not limit myself to details, except as claimed hereafter.

Figure 1 is a longitudinal section of a machine embodying the invention.

Fig. 2 is an enlarged longitudinal section of one of the combing units.

Fig. 3 is a left side elevation of one of the combing units.

Fig. 4 is a right side elevation of the same.

Fig. 5 is an enlarged vertical section of one end of a pair of combing rolls showing certain details of the gearing.

Fig. 6 is a top plan of one side of one combing unit showing details of gearing.

Figs. 7 and 8 are, respectively, front edge and side elevations of combing teeth each embedded in a section of a roll.

Fig. 9 is a front end elevation of the right hand end of one of the combing units showing the drive pulley and some details of gearing.

Fig. 10 is a top plan, enlarged, of a part of a container or pulverized cleaning or working material, showing means for operating the agitator therein.

At the front or feed end of the machine is a receiving hopper 1, to which wool is supplied, conveniently by pneumatic feed through the pipe 2 from suitable storage bins. In hopper 1 is a conveyer belt 3 which carries the wool over a shelf 4 to the first combing mechanism. This combing mechanism may conveniently comprise successive units C, C', each of which may comprise a suitable frame 5 of substantially boxlike form. Where a plurality of units are employed the adjacent end frame members $5^a$ may be bolted together, thus producing a combing group of independently constructed units, but all connected to operate continuously and progressively upon the wool as it passes through them.

Each of the combing units has a plurality of upper combing rolls 6, $6^a$, $6^b$, etc., and a plurality of lower conveying rolls 7, $7^a$, $7^b$, etc. These rolls are mounted on shafts 8 and the shafts have journals in suitable bearings in the sides of the frames 5. Each roll is provided with a plurality of combing teeth 9 and the teeth of each roll are arranged to pass between the teeth of the adjacent rolls. The teeth may preferably be of the form shown in Figs. 7 and 8, each having a round shank 10 and a flattened blade 11, the thinner edges of which are suitably rounded and directed in the direction of rotation of the roller; that is, Fig. 7 shows one of the blades edge on as it will advance toward the eye of the observer in the rotation of the roll.

The spacing of the teeth on the rollers may be varied to suit conditions, and the spacing in different ones of the successive combing units C, C', etc., may be varied. According to one plan, the teeth on the rollers in the first combing unit C will be arranged relatively far apart either as to the spacing of the teeth in each row or the spacing of the rows of teeth in relation to each other; and in the second combing unit C' the teeth will be arranged on the rollers closer together to give an intensified combing effect; and so on with respect to successive units.

In a preferred form of the invention, all the rollers revolve continuously to advance the wool through the machine and the combing is effected by running one set of rollers at faster speed than the other. For instance, the upper rollers run faster than the lower rollers. Also, in a preferred construction, the speed of the rollers is increased from the front toward the rear end of each of the combing units so as to amplify and speed up the combing process progressively as the wool is put into condition to permit this by the action of each of the successive combing rolls.

One suitable arrangement of gearing for effecting these purposes will now be explained, but it is to be understood that the driving connections for the different parts may be varied greatly, and the embodiment here given, while the best devised up to this time, is only one representative construction for this purpose.

The initial combing unit C has a drive pulley 12 carried by a transverse shaft 13 and driven by a belt from any suitable countershaft pulley 14. The transverse shaft 13 has at its left end (Figs. 3 and 5) a pinion 15 which meshes with a gear 16 on the shaft 8 of the first upper combing roll of the unit. Gearing 16 meshes with a gear 17 on the shaft 8 of the first lower combing roll. At the left side of the machine (Fig. 3) sprocket and chain connections are provided to drive the first, third and fifth lower roll shafts, each at an increased speed in relation to the previous one. For this purpose the initial shaft 8 has a sprocket 18 connected by a chain 19 to a smaller sprocket 20 on the third lower roll shaft. This sprocket 20 is of smaller diameter than sprocket 18. The same roll shaft has a sprocket 21 connected by a chain 22 to a sprocket 23 on the fifth lower roll shaft and sprocket 23 is smaller than sprocket 21.

The third and fifth lower roll shafts 8 have also at the left side of the machine gears 24 each of which engages a gear 25 of smaller (in this case one-half) diameter than the gear 24. These gears 25 are on the third and 5th upper roll shafts 8 and drive those rolls at a speed greater (in this case twice greater) than that of the corresponding lower roll.

At the right hand end of the machine (Figs. 4 and 9) the first lower roll shaft 8 has a sprocket 26 connected by a chain 27 with the sprocket 28 on the second roll shaft. This sprocket 28 is smaller than the sprocket 26 so that the second shaft and its roll $7^a$ are driven at a speed greater than that of the first lower roll 7. The second shaft 8 also has a sprocket 29 driving, by means of a chain 30, a smaller sprocket 31 on the fourth roll shaft; and by means of another sprocket 32 on said shaft chain 33 drives the smaller sprocket 34 of the sixth or last lower roll shaft of combing unit C.

The second, fourth and sixth lower roll shafts at the right hand side also have gears 35 each engaging a pinion 36 on the corresponding upper roll shaft; and these pinions 36 are smaller, specifically one-half the size of gears 29, to drive the upper rolls at twice the speed of the corresponding lower rolls. By this arrangement the first upper and lower rolls 6 and 7 are driven at the same speed since they are connected by gears 16 and 17 of the same diameter. Taking a certain speed as an example, these rolls may run at the rate of ten revolutions a minute. The proportions of the sprocket-and-chain gearing just above described are such that in the second couple of rolls, consisting of upper roll $6^a$ and lower roll $7^a$, the lower roll makes eleven revolutions per minute and the upper twenty-two. This relation of speeds is continued throughout the remaining couples of rolls. Thus, of the third set, lower roll $7^b$ makes twelve revolutions and upper roll $6^b$ twenty-four per minute. Of the fourth set, the roll $7^c$ makes thirteen revolutions and roll $6^b$ twenty-six. Of the fifth set, roll $7^b$ makes fourteen revolutions and roll $6^d$ twenty-eight; of the sixth set, roll $7^c$ makes fifteen revolutions and roll $6^e$ thirty.

Wool fed to the first set of rolls 6 and 7 is seized and fed by the teeth thereon to the second set, $6^a$, $7^a$. The teeth of the upper roll of this set move twice as fast as those of the lower set and in the same direction so that the wool is advanced by this set of rolls and is stretched and combed by the upper teeth in a forward direction while relatively retarded by the lower teeth. This action is repeated by each successive pair of rolls, the combing and stretching action, however, being accelerated progressively by the increased speed of the successive pairs of rolls. The wool is thus combed and straightened out at first with a relatively gentle action to avoid breaking or injuring the fibers, and then with an action of increasing speed and vigorousness as the wool becomes relatively straighter and smoother and is capable of being properly worked faster.

At the same time the mat or fleece of the wool becomes thinner as it progresses since the later rolls, by reason of their increased speed, handle a greater amount of wool in unit time.

At the discharge end of the combing unit C, is a gate or passage 37, through which the wool passes over a shelf 38, which preferably has its inner end 39 slotted to form fingers which fit between the teeth of roll 7ᵉ to assist in removing the wool therefrom. At the top of discharge opening 37 is a plate 39 similarly formed with fingers 40 projecting between the teeth of the roll 6ᵉ for a similar purpose.

Where a second combing unit C′ is employed, as in Fig. 1, the wool goes directly to it through an opening 40ᵃ and is then worked upon by a series of rollers substantially the same as previously described, but where necessary or desirable provided with differently arranged teeth, as previously mentioned, and also usually driven at a higher initial speed, so that in one example, to conform with the specific description of unit C, the lower rollers of unit C′, beginning at the front will run at speeds of 16, 17, 18, 19, 20 and 21 revolutions per minute. The action of the second unit or of other successive units, when employed, is to more completely stretch, straighten and comb the wool and reduce in thickness the fleece as it advances toward the discharge point.

For the purpose of more effectively combing it, the wool before being delivered to the combing machine, as for instance by pneumatic feed pipe 2, is placed in bins or is manipulated in different ways in the presence of a dry cleaning agent to primarily absorb a large part of the grease and suint and remove a large part of the dirt carried by raw wool, such as burs, manure and earthly matter. A suitable dry cleaning agent for this purpose which produces admirable results is finely divided, more or less dehydrated, gypsum. In some cases a large part or all of the gypsum and extraneous matter may be removed from the wool by beaters or other suitable devices, before it is delivered to the feeding hopper 1 of the combing machine; but according to another mode of treatment the wool may go to the feed hopper combined with more or less of the cleaning agent. It is also usually impossible to remove, by preliminary treatment before combing, all of the extraneous material, and the wool going to the hopper 1 will in most cases contain, in spite of any preliminary treatment, more or less extraneous matter, such as burs, vegetable fiber, manure, etc.

To provide for the discharge of dirt in process of combing, the combing units are preferably provided with perforated or grated bottoms 41. As the wool is combed and separated, the extraneous matter is loosened and is discharged through the grated bottoms 41 and removed by traveling conveyers 42 to a discharge pipe 43 for suitable disposition.

In some cases it may be desirable to add to the wool in the process of combing a cleaning agent, such as gypsum, or a smoothing and lubricating agent, such as talcum, and for this purpose, at one or more points adjacent to the combing units, hoppers 44 are provided to hold this material, which may be designated broadly as "working medium." The hopper has a perforated bottom 45 through which the medium is discharged, in this embodiment through a passage 46, and is deposited upon the wool as it passes over the intermediate shelf 38. To insure proper delivery of the medium, the hopper may be provided with an agitator 47 having blades 48 to loosen the material, and other blades 49 to move close to the foraminous bottom 45. Fig. 10 shows this agitator 47 provided with an extended shaft 48 fixed against rotation but capable of reciprocating motion. A gear 49 is driven from any other suitable gear device of the machine and rotates an arm 50 which carries a cam follower 51 engaging cam slot 52 on cam 53, fixed on the end of shaft 48. The gear 49 is fixed against end motion and as it revolves it causes cam roller 51 to reciprocate the cam and shaft 48 and so to reciprocate the agitator 47.

Evidently, when desired, a hopper 42 with other necessary parts might be placed adjacent to the feed end of the first combing unit C. In cases where the condition of the wool requires it, one or more of the hoppers may be provided with suitable pulverized cleaning material, such as gypsum, and in that case the wool is combed and worked thoroughly in the presence of cleaning material which, with its contained grease, suint and other extraneous matter, is discharged through the grated bottoms 41 and moved by the conveyer 42. Whether the gypsum is supplied to the wool or not during combing, one or more hoppers 44 may be supplied with smoothing or lubricating material, such as pulverized talcum. Talcum will usually be supplied toward the end of the combing process and when so supplied smooths and lubricates the fibers of the wool, which are thus enabled to slip more readily upon each other, and the last part of the combing operation is thus facilitated.

In many cases it is desirable at the end of the combing operations to treat the wool to completely remove any remaining dust or extraneous matter therein, such as remaining gypsum, or talcum, when those working medium have been employed. For this purpose the final unit B is provided which in this embodiment comprises a beater as an important part, and, therefore, may be generally described as a beater. This comprises a frame 54 suitably secured in relation to the last combing unit C'. From the discharge opening 55 of the combing unit the wool passes through an opening 56 to a conveyer belt 57, provided on its outer surface with rearwardly inclined teeth 58. This belt is supported on rollers 59 suitably driven and the upper surface of it travels in the direction indicated by the arrow close to a grated member 60. Below the belt the wool passage at this point is also provided with a grated bottom 61. Above the grated top member 60 is a hood 62 from which air is exhausted through a pipe 63 and suitable exhaust mechanism not shown. In this way, a strong draft of air is induced through the wool and a large part of the dust therein is removed through the pipe 63. From the toothed belt 57 the wool passes between rolls 64 having teeth which are inclined rearwardly at their meeting faces. The wool is thus brought into contact with the teeth 65 of large drum 66, which revolves as indicated by the arrow. The forwardly inclined teeth 65 take the wool from feed rollers 64 and move it within the housing 67 to engagement with a rotary agitating, bunching or fluffing device 68, consisting of a roll mounted on shaft 69 and provided with teeth 70 inclined rearwardly to the direction of rotation of the roll. In one embodiment the large drum 66 is run at a speed of 110 revolutions a minute and the agitator or punching device is run at 20 revolutions per minute. This serves to retard and thicken the fleece and at the same time loosen it, so as to permit the more ready final discharge of dust by the operation of the beater. The housing 67, adjacent to the agitating or punching device 68, is provided with perforations 71.

At the rear of drum 66 is the beater 72 mounted on a shaft 73 and in one embodiment designed to run at 440 revolutions a minute. The beater is provided with a plurality of beater flaps 74, which may be of leather, and the edges of these flaps are slit to fit between the teeth of drum 66. The beater is run at such a surface speed that the edges of the beater flaps move considerably faster than the teeth of the drum and the beater therefore removes the wool from the drum and whirls it around in the housing 75 and beats the remaining dust from the wool, a large part of this dust being discharged through the perforated bottom 76. The finally cleaned wool is thrown out of the discharge opening 77 by the blowing action of the beater.

Details of driving connections for parts of the beater may be varied greatly and are not shown particularly. The beater parts may however be driven from any convenient countershaft 78 by belts 79, or otherwise.

I claim:

1. In a machine for treating wool, combing means comprising two or more pairs of toothed combing members, the speed of one member of each pair being greater than the other and the speed of the corresponding member of each successive pair being greater than that of the preceding pair.

2. In a machine for treating wool, combing mechanism comprising sets of differentially speeded toothed members for advancing wool continuously and other toothed members designed to act upon the same wool in the same direction but at greater speeds to straighten and comb the wool as it advances.

3. In a machine for treating wool, the combination of a housing, a set of differentially speeded toothed rollers substantially in line therein, and another set of differentially speeded toothed rollers substantially in line, and means for driving the two sets of rolls so that their adjacent toothed faces acting on the same wool move in the same direction but the rollers of one set move faster than the corresponding ones of the other set to pull, stretch and straighten the wool as it advances.

4. In a machine for treating wool, combing mechanism comprising a set of toothed rolls of which successive ones are driven faster than the preceding ones, and another set of toothed rolls coöperating with the first set and driven so that adjacent faces of rolls of the different sets travel in the same direction, but each roll of the second set is driven considerably faster than the corresponding roll of the first set.

5. In a machine for treating wool, the combination of a housing, a set of toothed rolls therein, means for driving them so that each successive one travels faster than the succeeding one, another set of rolls of number to correspond with the first set, means for driving the second set of rolls so that each successive one travels faster than the succeeding one, the ratio of increase of speed between the rolls of the second set being greater than that of the first.

6. In a machine for treating wool, the combination of a housing having a perforated bottom, a row of roll shafts journaled in the housing and each carrying a toothed roll, a second row of roll shafts substantially parallel to the first journaled in the housing and carrying another set of toothed rolls to coöperate with the first set, means for driving the first set of shafts in the same direction and means for driving the second set of shafts in the opposite direction and at higher speeds than those of the first, whereby wool is advanced between the sets of rolls and simultaneously stretched and combed.

7. In a machine for treating wool, the combination of a first pair of rolls, means for driving them at the same speed to initially feed wool, other successive pairs of combing rolls driven at greater speeds, one of the rolls of each successive pair being driven at substantially greater speed than the other roll of the pair.

8. In a machine for treating wool, the combination of mechanism for combing and advancing wool in the form of a relatively flat continuous fleece, and beating mechanism comprising a toothed drum, a retarder coöperating with the drum to bunch or fluff the wool, a housing and a rotary beating device therein having flexible flaps to remove wool from the drum and beat it within the housing.

9. In a machine for treating wool, the combination of mechanism for combing and advancing wool in the form of a relatively flat continuous fleece, and beating mechanism comprising a toothed drum, a retarder coöperating with the drum to bunch or fluff the wool, a housing and a rotary beating device therein having flexible flaps to remove wool from the drum and beat it within the housing, the action of the beater serving also to eject the wool through a discharge opening in the housing.

10. In a machine for treating wool, the combination of a plurality of pairs of toothed combing cylinders, the upper cylinders of all the pairs being arranged substantially in one plane and the lower cylinders of all pairs being arranged substantially in another parallel plane, initial driving means and driving connections therefrom to all of the cylinders, said driving connections being constructed and arranged to drive successive ones of the cylinders in one of the planes at increased speed in relation to the preceding cylinders, and to drive the cylinders of each pair in the other plane at a substantially greater speed than its companion cylinder.

11. In a machine for treating wool, the combination of a plurality of combing units, each unit comprising a plurality of pairs of toothed cylinders, one of the cylinders of each pair being driven at greater speed than the other, and successive pairs of cylinders in the direction of progression of the wool being driven at greater speed than preceding ones, means for supplying pulverized cleaning or lubricating material intermediate two of said units, and beating mechanism posterior to the last combing unit to free the wool from the cleaning or lubricating material.

HIRAM Y. McBRIDE.